(12) United States Patent
Kawakita

(10) Patent No.: US 8,060,021 B2
(45) Date of Patent: Nov. 15, 2011

(54) PORTABLE RADIO TERMINAL AND COMMUNICATION CONTROL METHOD

(75) Inventor: Masaya Kawakita, Yokohama (JP)

(73) Assignee: Kyocera Corporation, Kyoto (JP)

(*) Notice: Subject to any disclaimer, the term of this patent is extended or adjusted under 35 U.S.C. 154(b) by 471 days.

(21) Appl. No.: 12/298,500

(22) PCT Filed: Mar. 27, 2007

(86) PCT No.: PCT/JP2007/056476
§ 371 (c)(1),
(2), (4) Date: Feb. 2, 2009

(87) PCT Pub. No.: WO2007/125711
PCT Pub. Date: Nov. 8, 2007

(65) Prior Publication Data
US 2009/0325500 A1 Dec. 31, 2009

(30) Foreign Application Priority Data
Apr. 27, 2006 (JP) ................................. 2006-124124

(51) Int. Cl.
*H04B 17/00* (2006.01)
(52) U.S. Cl. ............... 455/67.11; 455/556.1; 455/556.2; 455/557; 455/344

(58) Field of Classification Search ............... 455/67.11
See application file for complete search history.

(56) References Cited

U.S. PATENT DOCUMENTS

| | | | |
|---|---|---|---|
| 2006/0046704 A1* | 3/2006 | Hori et al. | 455/418 |
| 2006/0098403 A1* | 5/2006 | Smith | 361/683 |
| 2007/0060212 A1* | 3/2007 | Shah | 455/572 |
| 2007/0191069 A1* | 8/2007 | Matsumoto | 455/566 |
| 2008/0043714 A1* | 2/2008 | Pernu | 370/350 |
| 2008/0129703 A1* | 6/2008 | Takeshita et al. | 345/173 |
| 2009/0061781 A1* | 3/2009 | Zhang | 455/66.1 |

FOREIGN PATENT DOCUMENTS
JP 2003-099207 4/2003
* cited by examiner

*Primary Examiner* — Lincoln Donovan
*Assistant Examiner* — Ryan Jager
(74) *Attorney, Agent, or Firm* — DLA Piper LLP (US)

(57) ABSTRACT

The radio OFF mode control unit 12 cancels the radio OFF mode temporarily, even though the portable radio has shifted to a mass storage mode, when the access monitoring unit 13 does not receive any access command from the PC 90 for a predetermined time. The USB control unit 14 sets a state where the memory card does not exist virtually so that no access command is received from the PC. Moreover, the incoming information unit 15 inquires whether there is incoming information to the server 100.

12 Claims, 7 Drawing Sheets

Communication control flow

FIG. 6
(A)
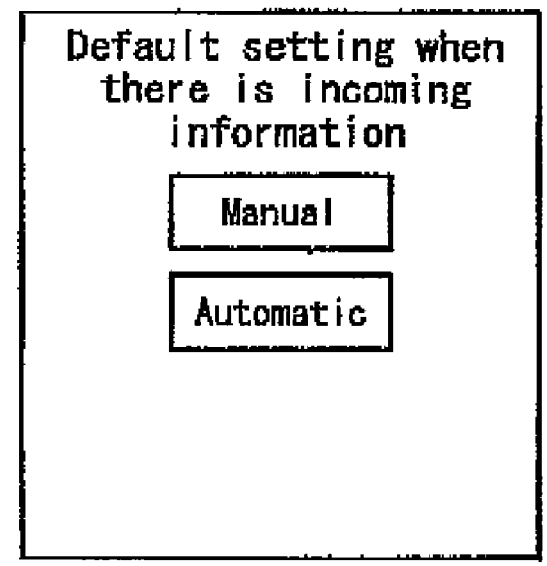
(B)
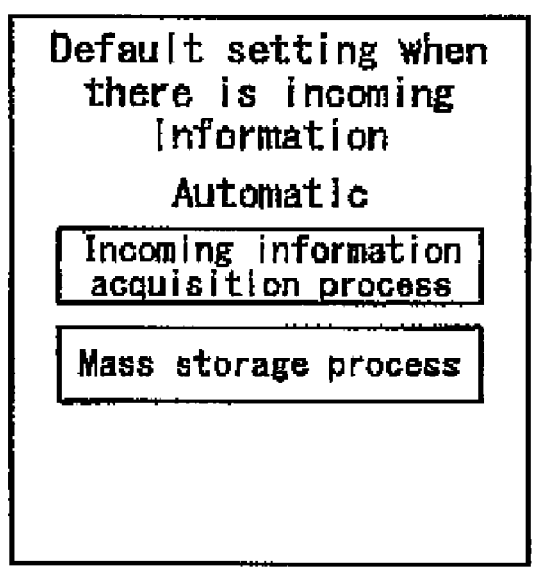

FIG. 7
(A)
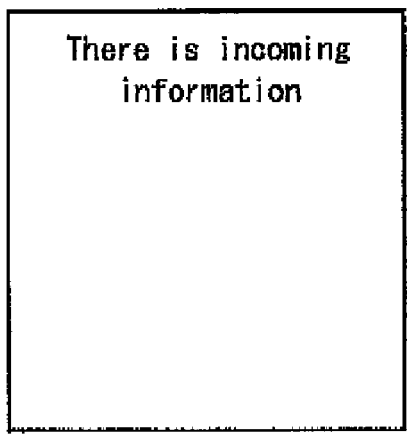
(B)
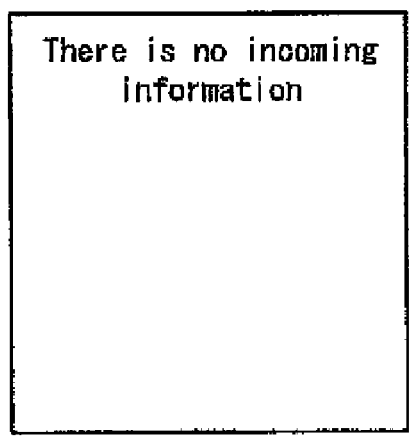
(C)
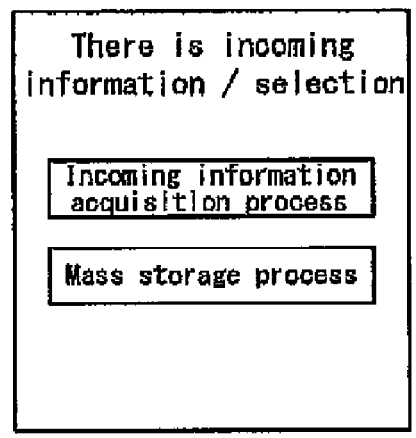

PORTABLE RADIO TERMINAL AND COMMUNICATION CONTROL METHOD

CROSS REFERENCE TO RELATED APPLICATION

This application is a national stage of international application No. PCT/JP2007/056476 filed Mar. 27, 2007, which also claims the benefit of priority under 35 U.S.C. §119 to Japanese Patent Application No. 2006-124124 filed on Apr. 27, 2006, the entire contents of which are incorporated herein by reference.

FIELD OF THE INVENTION

The present invention relates to technology for preventing conflict between access from an external device and access by radio communication in a portable radio terminal such as a cell phone, a digital camera, a PDA or the like comprising a communication unit which connects to the external device through a USB cable and the like.

DESCRIPTION OF THE RELATED ART

Generally, mass storage devices such as cell phones, digital cameras, PDAs and the like connected to a personal computer (hereinafter abbreviated as "PC") through communication unit such as USB or the like are capable of reading/writing data according to commands from the PC (see Japanese Patent Application Laid-open No. 2003-99207).

DISCLOSURE OF THE INVENTION

Problems to be Solved by the Invention

In portable radio terminals such as cell phones and the like, there are models of the portable radio terminals whose memory card equipped therein can be used as a removable medium when they are connected to a PC through USB cable or the like in a mass storage mode. Such a portable radio terminal is designed to access a file system provided therein when receiving electronic mails, voice data, image data and the like by radio communication.

When a USB cable is connected, the portable radio terminal shifts to the mass storage mode where reading/writing data to the PC is allowed. In this case, if there is data reading/writing operations from the PC and if there is data reception by radio communication simultaneously, in other words, when there is conflict between theses accesses, access to the file system and access to the memory card are conflicted. Therefore, data in the file system are in danger of being destroyed.

In order to solve the above problem, a portable radio terminal is designed to shift to a radio OFF mode where the radio communication cannot be performed, as well as shift to the mass storage mode. In other words, when being placed in a state where reading/writing data to the PC is allowed, the portable radio terminal is set unable to receive data by the radio communication.

However, it is inconvenient to a user since the portable radio terminal cannot receive data by radio communication in the mass storage mode. For example, a user cannot confirm whether there is incoming data (information) by radio communication in the mass storage mode even while the PC does not read/write data to the memory card. Therefore, a user needs to cancel the mass storage mode by disconnecting USB cable or the like in order to confirm whether there is incoming data by radio communication.

Under the mass storage mode, the PC is capable of reading/wiring data to the memory card, but reading/writing operations are not performed all through a period of the mass storage mode. Therefore, considering user's convenience, it is desirable that the portable radio terminal allows a user to confirm whether there is incoming data using a period when there is no reading/writing operation between the PC and the memory card even though being in the mass storage mode.

In the view of the above problem, an object of the present invention is to provide a portable radio terminal capable of confirming whether there is incoming data by radio communication even though being connected to an external device such as PC or the like and a communication control method.

Means for Solving the Problem

To achieve the above object, the portable radio terminal of the present invention, has a first communication unit for performing radio communication and a second communication unit for communicating with an external device, sets a radio OFF mode that disables radio communication by the first communication unit and performs data processing according to access from an external device when the second communication unit detects mat the external device is connected, and enables radio transmission by canceling the radio OFF mode when the second communication unit detects that there is no external device connected, and the portable radio terminal comprises an access monitoring unit for monitoring access for data processing from the external device and cancelling the radio OFF mode when there is no access for a predetermined time; an incoming information process unit for inquiring whether there is incoming information through the first communication unit when the radio OFF mode is canceled, and setting the radio OFF mode again after receiving a response; and an external device control unit for sending information to the external device in order not to perform data processing if there is access for the data processing from the external device when the radio OFF mode is canceled.

The portable radio terminal of the present invention is characterized in that the incoming information process unit also acquires incoming information when receiving the response.

The portable radio terminal of the present invention is characterized in that when the response received indicates that there is incoming information, the incoming information process unit displays a screen for selecting acquisition or non-acquisition of the incoming information, and when acquisition of the incoming information is selected by a user, it acquires the incoming information and sets the radio OFF mode again, and when non-acquisition the incoming information is selected by the user, it sets the radio OFF mode again.

The portable radio terminal of the present invention is characterized in further comprising an incoming information setting unit for previously setting acquisition or non-acquisition of incoming information as a process performed when a response for the inquiry about whether there is incoming information indicates that there is incoming information, and wherein when receiving a response indicating that there is incoming information, the incoming information process unit acquires the incoming information and sets the radio OFF mode again when acquisition of incoming information is previously set by the incoming information setting unit, and it sets the radio OFF mode again when non-acquisition of incoming information is previously set.

The portable radio terminal of the present invention is characterized in that when the radio OFF mode is canceled, the incoming information process unit inquires whether there is incoming information or not through the first communication unit, and sets the radio OFF mode again after a response has been received or when a predetermined time has elapsed since the radio OFF mode was canceled.

The portable radio terminal of the present invention is characterized in that when the radio OFF mode is set again by the incoming information process unit, the access monitoring unit monitors access for data processing from the external device, and cancels the radio OFF mode again when there is no access for a predetermined time.

While the present invention is described as portable radio terminals, the present invention may implemented as methods substantially corresponding to those, and the present invention also includes communication control methods by the portable radio terminals.

Effect of the Invention

According to the present invention, in case of being connected to an external device, the portable radio terminal cancels a radio OFF mode temporarily and inquires whether there is incoming information if there is no access for data processing from the external device for a predetermined time. Accordingly, even while the external device is connected, it is possible to confirm whether there is incoming information without trouble caused by conflict between access from the external device and access by radio communication. Therefore, a function for confirming whether there is incoming information equipped in the portable radio terminal is preserved. Moreover, a user is not necessary to disconnect the external device in order to confirm whether there is incoming information or not. Furthermore, there is no trouble caused by the conflict, so that stability is ensured.

BRIEF DESCRIPTION OF THE DRAWINGS

FIG. 6 exemplifies a screen displayed on a display unit at the incoming information setting process; and FIG. 7 exemplifies a screen displayed on the display unit at the incoming information process.

Figure 1:
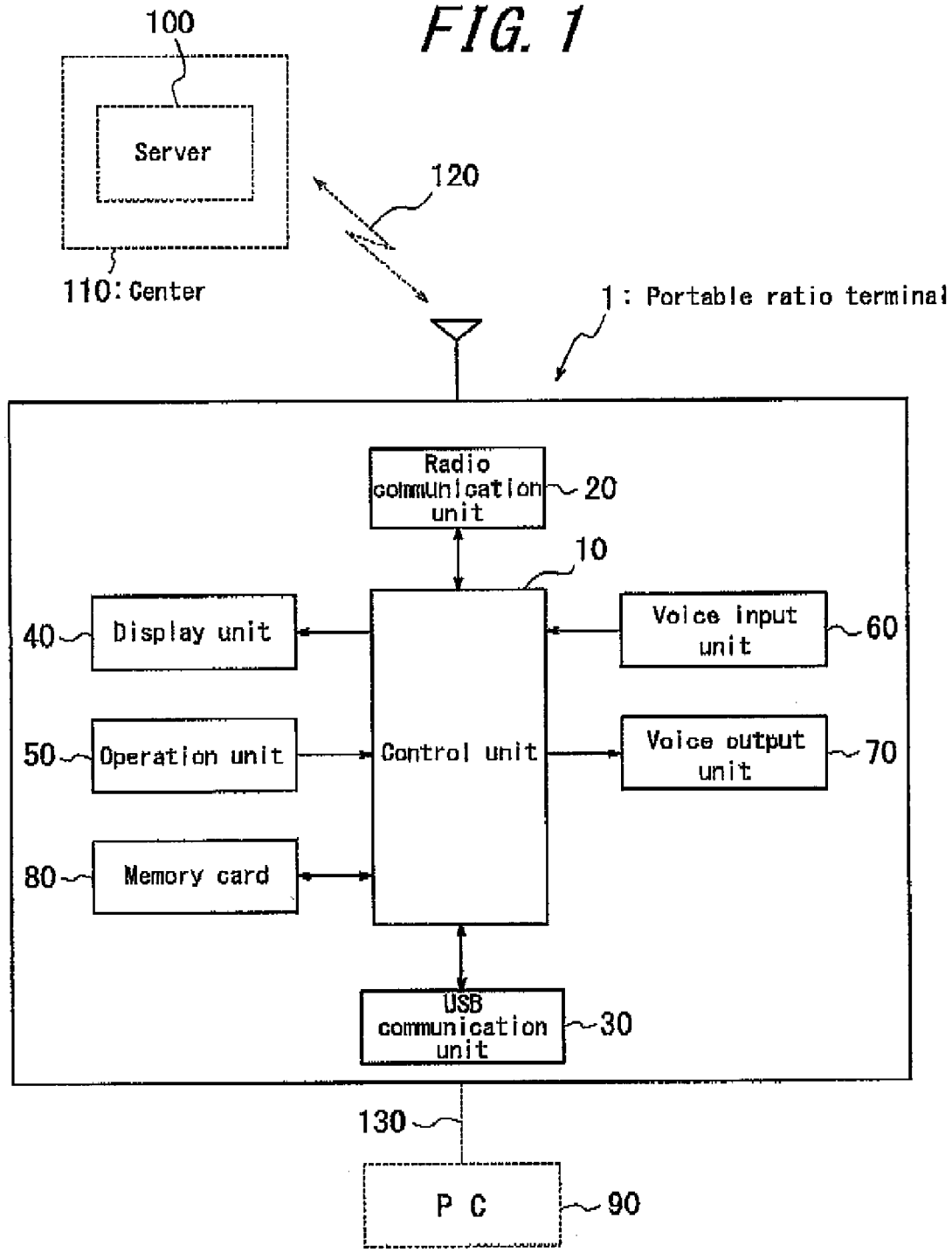
FIG. 1 is a block diagram illustrating constitution of the portable radio terminal according to an embodiment of the present invention.

REFERENCE SYMBOLS 1 portable radio terminal
10 control unit
11 file system control unit
12 radio OFF mode control unit
13 access monitoring unit
14 USB control unit
15 incoming information process unit
16 incoming information setting unit
20 radio communication unit
30 USB communication unit
40 display unit
50 operation unit
60 voice input unit
70 voice output unit
80 memory card
90 PC
100 server
110 center
120 radio communication network
130 USB cable

BEST MODE FOR CARRYING OUT THE INVENTION

Preferred embodiments of the present invention will now be described with reference to the accompanying drawings.

[Constitution]

First, constitution of a portable radio terminal according to an embodiment of the present invention will be described. FIG. 1 is a block diagram illustrating constitution of the portable radio terminal briefly. The portable radio terminal 1 is capable of transmitting/receiving e-mails, voice data, image data and the like to a server 100 provided in a center 110 by radio communication through a radio communication network 120 connected to a base station (not shown) The portable radio terminal 1 is also capable of reading/writing data to a memory card 80 in response to a command from a PC 90 through a USB cable 130. As shown in FIG. 1, the portable radio terminal 1 comprises a control unit 10, a radio communication unit 20, a USB communication unit 30, a display unit 40, an operation unit 50, a voice input unit 60, a voice output unit 70 and a memory card 80.

The radio communication unit 20 receives data which the server 100 transmits via the radio communication network 120, as well as transmits data of the portable radio terminal 1 to the server 100. According to a communication protocol of the USB Standard, the USB communication unit 30 receives a command that the PC 90 sends through the USB cable 130, and sends a response for the command.

The display unit 40 is, for example, an LCD, and displays data under the control of the control unit 10. The operation unit 50 is, for example, a push button, and outputs data according to user's operations to the control unit 10. The voice input unit 60 is, for example, a microphone, and inputs user's voice when voice communication is performed through the radio communication unit 20. Similarly, the voice output unit 70 is, for example, a speaker and outputs voice received from the radio communication unit 20 when voice communication is performed through the radio communication unit 20. The memory card 80 is a mass storage. The control unit 10 writes data into the memory card 80 or reads out data from the memory card 80 according to access from the PC 90 through the USB communication unit 30.

The control unit 10 performs input/output of data between the radio communication unit 20, the USB communication unit 30, the display unit 40, the operation unit 50, the voice input unit 60, the voice output unit 70 and the memory card 80, and controls the entire portable radio terminal 1.

Figure 2:
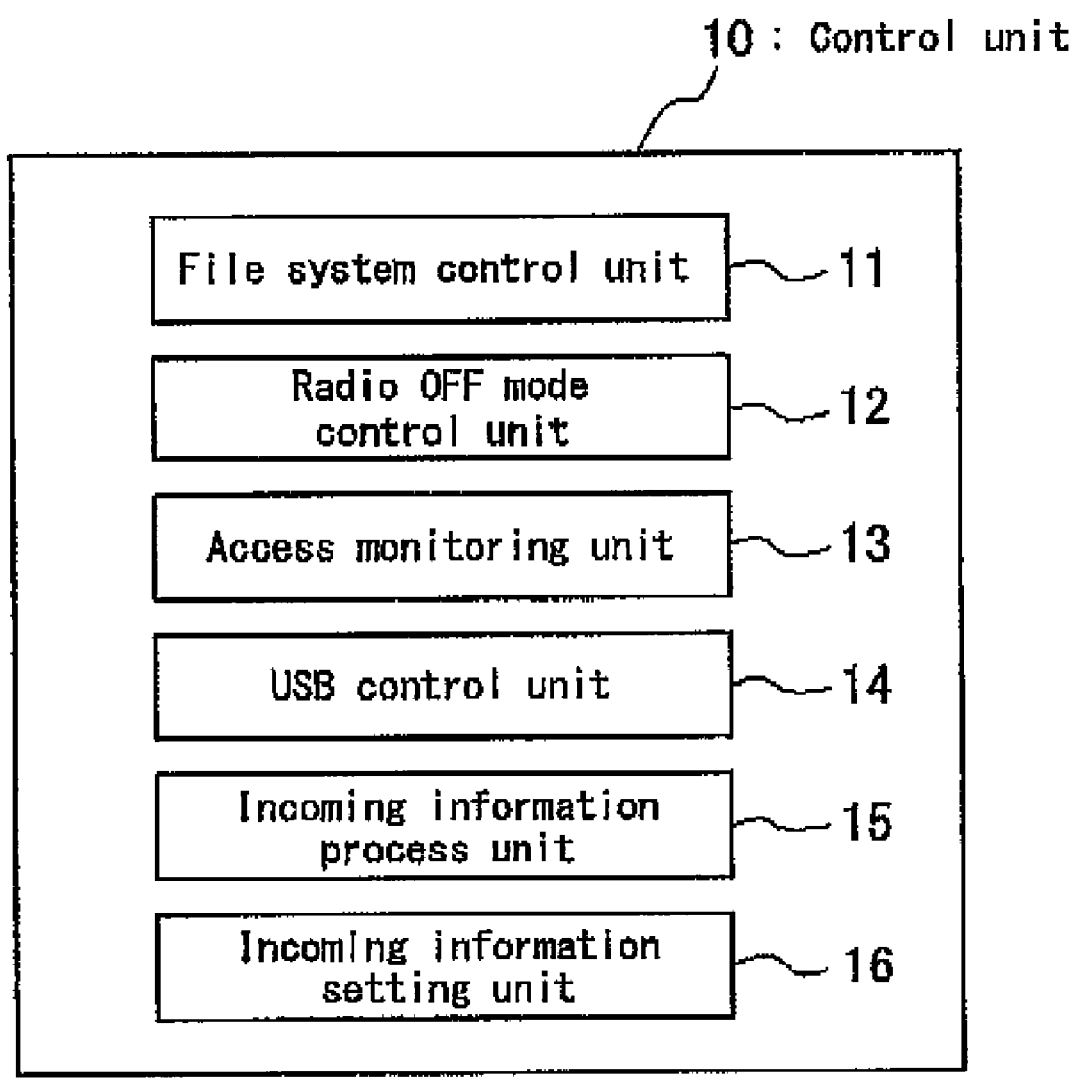
FIG. 2 is a block diagram illustrating functions of the control unit shown in FIG. 1.

FIG. 2 is a block diagram illustrating functions of the control unit 10 shown in FIG. 1. The control unit 10 comprises a file system control unit 11, a radio OFF mode control unit 12, an access monitoring unit 13, a USB control unit 14, an incoming information process unit 15, and an incoming information setting unit 16.

The file system control unit 11 controls, when data are received by radio communication through the radio communication unit 20, access to the file system based on the data. For example, when image data or e-mails are received, the file system control unit stores the data in a memory unit not shown, and displays them on the display unit 40. When voice data are received, the file system control unit 11 outputs the data to the voice output unit 70.

When the USB cable 130 is connected to a connector of the portable radio terminal 1, or there is an input from the operation unit 50 according to user's operation after the USB cable 130 has been connected, the radio OFF mode control unit 12 switches to the mass storage mode, and also sets the radio OFF mode indicating a state where data communication cannot be performed through the radio communication unit 20. Thus, the radio communication unit 20 refuses reception of data that the server 100 transmits, and the USB communication unit 30 communicates with the PC 90. When the USB cable 130 is disconnected from the connector of the portable radio terminal 1, the radio OFF mode control unit 12 cancels the radio OFF mode so that the data communication can be performed through the radio communication unit 20. Moreover, the radio OFF mode control unit 12 cancels the radio OFF mode when there is no access command to the memory card 80 for a predetermined time under the mass storage mode. In the mass storage mode, the radio OFF mode control unit 12 sets the radio OFF mode again when a predetermined condition such as a predetermined time has elapsed since the radio OFF mode was canceled or the like is satisfied. Details of the condition for setting and cancelling the radio OFF mode in the mass storage mode will be described later on.

The access monitoring unit 13 determines whether a command received from the PC 90 through the USB communication unit 30 is an access command to the memory card 80 in the mass storage mode. And, the access monitoring unit 13 resets a timer and gets it started at the point when transmitting a response for the access command. That is, the timer continues to operate unless an access command is received. When time-up occurs after a predetermined time has elapsed, the radio OFF mode control unit 12 cancels the radio OFF mode. In here, the access command to the memory card 80 is a command to write data into the memory card 80 or read out data from the memory card 80. In this embodiment, commands based on SCSI Standard are transmitted between the portable radio terminal 1 and the PC 90 using the USB communication protocol. For example, there are "WRITE6", "WRITE10", "READ6", "READ10", "MODE-SENSE6", "MODE-SENSE10", "READ-CAPACITY" and "SEND-DIAGNOSTIC" as access commands.

The USB control unit 14 allows the PC 90 to access the memory card 80 while the radio OFF mode is set by the radio OFF mode control unit 12 in the mass storage mode. On the other hand, the USB control unit 14 sets a state where there is no medium virtually, which is the memory card 80 (or a state where a medium is not prepared) when the radio OFF mode is canceled by the radio OFF mode control unit 12 in the mass storage mode. In this case, when receiving a command of "TEST-UNIT-READY" from the PC 90, the USB control unit 14 sends a response of "COMMAND-FAILED" to the PC 90 as information in order not to perform data processing. In here, the command of "TEST-UNIT-READY" is a command that the PC 90 sends regularly to inquire whether it is possible to access a storage medium, i.e. the memory card 80. When receiving a "REQUEST-SENSE" command from the PC 90, the USB control unit 14 sends a response of "NO-MEDIA" indicating that the memory card 80 does not exist to the PC 90. In here, the command of "REQUEST-SENSE" is a command for inquiring the reason why it is not possible to access the memory card 80 upon receipt of the response of "COMMAND-FAILED" for the command of "TEST-UNIT-READY".

The incoming information process unit 15 transmits a center inquiry, to the server 100 through the radio communication unit 20, for confirming whether there is incoming information like a new e-mail, a message or the like, and receives a response about whether there is incoming information or not. When the response indicates that there is incoming information, the incoming information process unit 15 determines either an incoming information acquisition process for acquiring incoming information from the server 100 or a mass storage process for accessing the memory card 80 from the PC 90, based on default setting (automatic setting) of a user previously done by the incoming information setting unit 16, or operation setting (manual setting) of a user when receiving a response indicating there is incoming information. When the incoming information acquisition process is determined, the incoming information is acquired from the server 100 and displayed on the display unit 40. When the mass storage process is determined, the radio OFF mode control unit 12 sets the radio OFF mode again and the access monitoring unit 13 resets the timer.

The incoming information setting unit 16 previously sets the process performed when the incoming information process unit 15 receives a response indicating that there is incoming information from the server 100 according to operations of a user. Specifically, The incoming information setting unit 16 sets whether the incoming information acquisition process or the mass storage process is performed manually (by making a user select when receiving a response indicating that there is incoming information) or automatically (by making a user select it previously). FIG. 6 shows an example of a screen display for setting a process mode and process content when a response indicating that there is incoming information is received at the incoming information setting process performed by the incoming information setting unit 16. The incoming information setting unit 16 displays the screen shown in FIG. 6(A) on the display unit 40 according to operations of a user through the operation unit 50, and makes the user select a "manual" or "automatic" mode. According to user's selection, the "manual" or "automatic" mode is set as default. When the "automatic" mode is set, the incoming information setting unit 16 displays a screen shown in FIG. 6(B) on the display unit 40 and makes a user select a process. According to user's selection, the "incoming information acquisition process" or "mass storage process" is set as default in the "automatic" mode.

[Operation]

Figure 3:
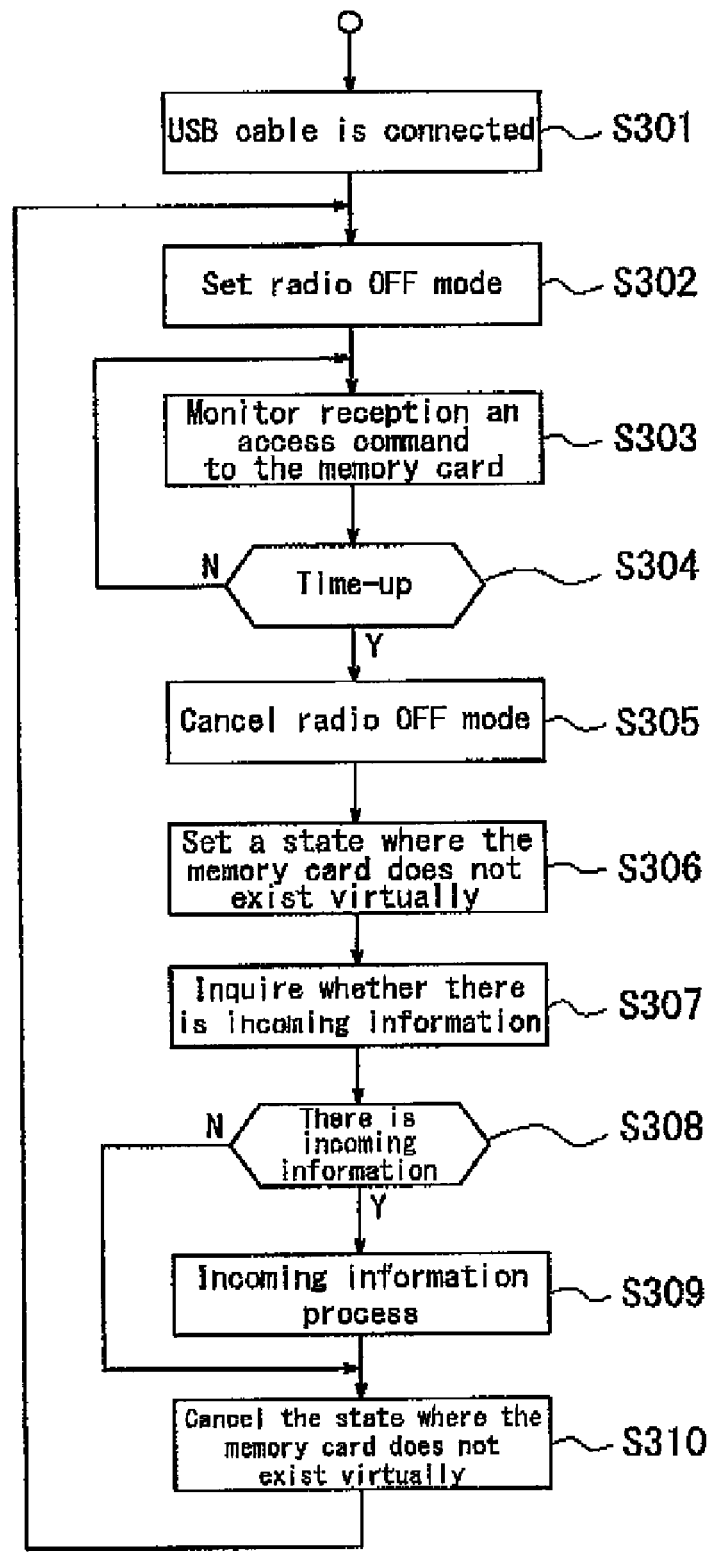
FIG. 3 is a flow chart for illustrating a communication control process of the portable radio terminal 1.
Figure 4:
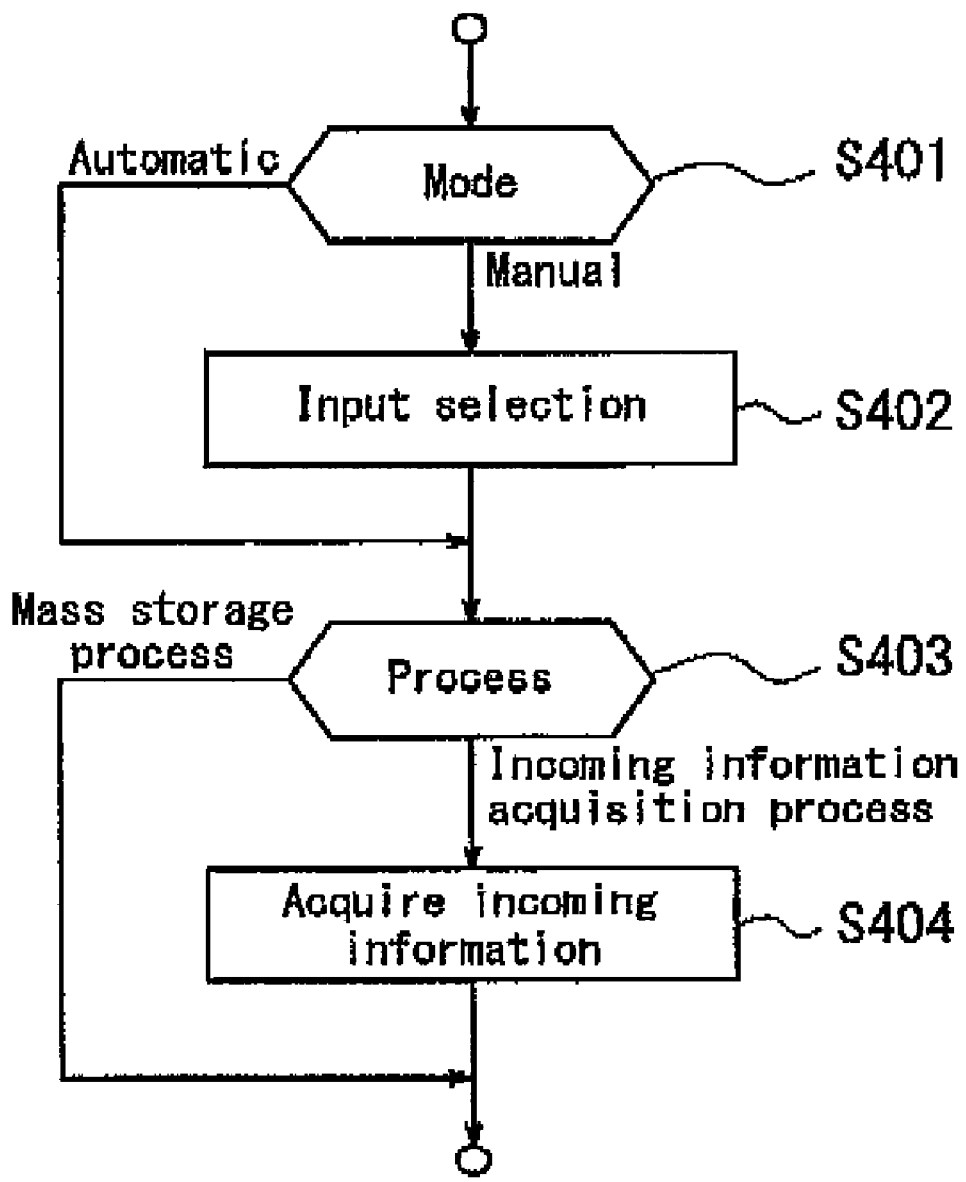
FIG. 4 is a flow chart for illustrating an incoming information process of FIG. 3.
Figure 5:
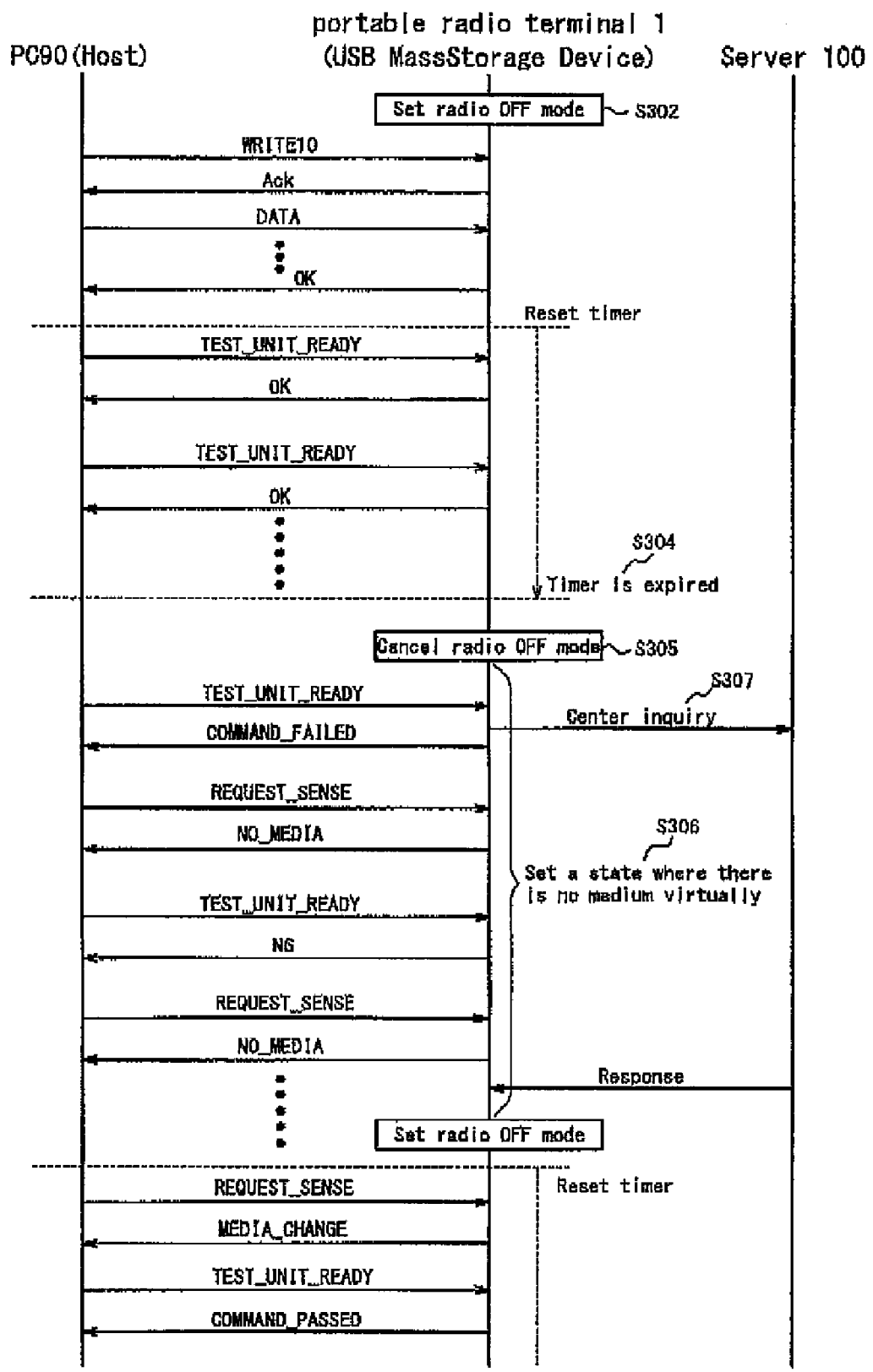
FIG. 5 shows communication flows between the portable radio terminal and the PC and communication flows between the portable radio terminal and the server.

Next, operations of the portable radio terminal 1 shown in FIG. 1 will be described. FIG. 3 is a flow chart for illustrating the entire communication control process of the portable radio terminal 1; FIG. 4 is a flow chart for illustrating an incoming information process among the communication control process shown in FIG. 3; FIG. 5 shows communication flows between the portable radio terminal 1 and the PC 90 and communication flows between the portable radio terminal 1 and the Server 100; and FIG. 7 exemplifies a screen displayed on the display unit 40 in the incoming information process. Hereinafter, operations will be described by referring to FIGS. 3~5 and 7.

First, when a user connects the USB cable 130 to the connector of the portable radio terminal 1, the USB communication unit 30 recognizes the connection, and switches to the mass storage mode where the PC 90 can access the memory card 80 (step S301). The radio OFF mode control unit 12 of the control unit 10 sets the radio OFF mode (step S302), which allows the PC 90 to access the memory card 80 through the USB communication unit 30, and which disables data transmission/reception through the radio communication unit 20.

When switching to the mass storage mode, as shown in FIG. 5, the control unit 10 receives a command from the PC 90 and sends a response through the USB communication unit 30. For example, when receiving a command of "TEST-UNIT-READY" that the PC 90 sends regularly, the control unit 10 sends a response of "OK" because the PC 90 is allowed to access the memory card 80.

The access monitoring unit 13 monitors reception of an access command to the memory card 80 from the PC 90. The access monitoring unit 13 starts to monitor whether an access command is received or not with a timer when a response for the access command is sent, and keeps monitoring until a predetermined time elapses (steps S303, S304). When the timer is expired (time-up), the radio OFF mode control unit 12 cancels the radio OFF mode (step S305). By this step, it becomes possible to transmit/receive data through the radio communication unit 20. Moreover, the USB control unit 14 sets a state where the memory card 80 does not exist virtually (step S306). By this step, it becomes impossible for the PC to access the memory card 80 through the USB communication Unit 30.

After setting the state where the memory card 80 does not exist virtually, and if the radio OFF mode is canceled, the USB control unit 14 sends a response of "COMMAND-FAILED" indicating that the memory card 80 cannot be accessed by the PC when it receives a command of "TEST-UNIT-READY" from the PC 90, as shown in FIG. 5. And, it receives a command of "REQUEST-SENSE", and sends a response of "NO-MEDIA" indicating that the memory card 80 does not exist.

Returning to FIG. 3, the incoming information process unit 15 transmits a center inquiry for confirming whether there is incoming information to the server 100, and receives a response about whether there is incoming information (step S307). At this time, a screen showing whether there is incoming information is displayed on the display unit 40, as shown in FIGS. 7(A) and (B). And, when a response indicating that there is incoming information is received, the incoming information process shown in FIG. 4 is performed (steps S308, 309).

Referring to FIG. 4, the incoming information process unit 15 determines which of the "manual" mode and the "automatic" mode is set by the incoming information setting unit 16 (step S401), and when the "manual" mode is set, it displays a screen on the display unit 40 as shown in FIG. 7(c), and makes a user select either the incoming information acquisition process or the mass storage process (step S402). The incoming information process unit 15 acquires the incoming information from the server 100 (step S404) when the "manual" mode is set and the incoming information acquisition process is selected, or when the "automatic" mode is set and the incoming information acquisition process is previously set. For example, the incoming information process unit 15 acquires bibliographic items of an e-mail or a message from the server 100.

When the incoming information is e-mail, the kinds of data to be acquired may be previously set by a user. For example, according to settings by a user, it may acquire the body of the e-mail, or may acquire the body and attached files as well as the bibliographic items. While the incoming information process unit 15 has been described to receive a response about whether there is incoming information for the center inquiry, it may directly receive incoming information such as bibliographic items of e-mail or the like instead of the response about whether there is incoming information.

Returning to FIG. 3, when the incoming information process is completed at step S309, the USB control unit 14 cancels the virtual setting for the state where the memory card 80 does not exist (step S310) in case that a response indicating that there is no incoming information is received at step S308 or a response indicating whether there is incoming information is not received although a predetermined time has passed since the center inquiry was transmitted (not shown) at the step S307. By this step, it becomes possible for the PC 90 to access the memory card 80 through the USB communication unit 30. And then, the process flow proceeds to step S302, and the radio OFF mode control unit 12 sets the radio OFF mode. By this step, it becomes impossible to transmit/receive data through the radio communication unit 20.

When the virtual setting for a state where the memory card 80 does not exist is canceled, and the radio OFF mode is set, the USB control unit 14 receives a command of "REQUEST-SENSE" from the PC 90 and sends a response of "MEDIA-CHANGE" indicating that the memory card 80 exists, as shown in FIG. 5. And, the USB control unit 14 receives a command of "TEST-UNIT-READY" and sends a response of "COMMAND-PASSED" indicating that the memory card 80 can be accessed by the PC 90.

The access monitoring unit 13 resets the timer, and monitors reception of access command. In this way, processes of steps S302~S301 are repeated until the USB cable is disconnected and the mass storage mode is canceled (not shown).

As described above, according to the portable radio terminal 1 of an embodiment of the present invention, the radio OFF mode is temporarily canceled by the radio OFF mode control unit 12 when the access monitoring unit 13 does not receive any access command from the PC for a predetermined time, although the portable radio terminal 1 has switched to the mass storage mode since the PC 90 was connected. And, the USB control unit 14 sets the state where the memory card 80 does not exist virtually so that data processing is not performed based on an access command from the PC 90, and the incoming information process unit 15 inquires whether there is arrived data or not. Therefore, the portable radio terminal 1 can confirm whether there is incoming information during the mass storage mode, so that it preserves a function provided therein for confirming whether there is incoming information or not.

Moreover, according to the portable radio terminal 1 of an embodiment of the present invention, as a process performed when a response indicating there is incoming information is received, the incoming information setting unit 16 previously sets a manual mode or an automatic mode based on user's operation, and previously sets which one has a priority in the incoming information acquisition process and the mass storage process based on the user's operation in case of the automatic mode. Therefore, when the incoming information process unit 15 receives a response indicating that there is incoming information, a process is performed based on user's intention by the incoming information setting unit 16.

Furthermore, according to the portable radio terminal 1 of an embodiment of the present invention, when the incoming information process unit 15 has not received any response until a predetermined time has passed since it transmitted an inquiry of whether there was incoming information, the virtual setting for the state where the memory card 80 does not exist is cancelled, and the radio OFF mode is set so that the process generally performed in the mass storage mode is performed. Therefore, although there is no response from the server 100, the portable radio terminal 1 returns to the general mass storage mode after a predetermined time elapsed without keeping the state where the radio OFF mode is cancelled, so that the memory card 80 can be accessed by the PC 90.

The invention has been described in detail with particular reference to certain preferred embodiments thereof, but it will be understood that variations and modifications can be effected within the spirit and scope of the invention. For example, the above embodiments are described by being assumed to be a portable radio terminal, but present invention is applicable to a portable terminal having a function for a radio communication such as a cell phone or the like. In this case, the portable terminal may have other functions such as a function for a camera. Moreover, in the above embodiments, transmission to the PC is performed based on the USB Standard, but the present invention is applicable to communication unit which are not based on the USB Standard and may use any communication unit by which a PC accesses a memory card provided in the portable radio terminal and the like.

The invention claimed is:

1. A portable radio terminal having a first communication unit for performing radio communication and a second communication unit for communicating with an external device, setting a radio OFF mode that disables radio communication by the first communication unit and performing data processing according to access from an external device when the second communication unit detects that the external device is connected, and enabling radio communication by canceling the radio OFF mode when the second communication unit detects that there is no external device connected, comprising:
   an access monitoring unit for monitoring access for data processing from the external device and cancelling the radio OFF mode when there is no access for a predetermined time;
   an incoming information process unit for inquiring whether there is incoming information through the first communication unit when the radio OFF mode is canceled, and setting the radio OFF mode again after receiving a response; and
   an external device control unit for sending information to the external device in order not to perform data processing if there is access for the data processing from the external device when the radio OFF mode is canceled.

2. The portable radio terminal of claim 1, wherein the incoming information process unit also acquires incoming information when receiving the response.

3. The portable radio terminal of claim 1, wherein when the response received indicates that there is incoming information, the incoming information process unit displays a screen for selecting acquisition or non-acquisition of the incoming information, and when acquisition of the incoming information is selected by a user, it acquires the incoming information and sets the radio OFF mode again, and when non-acquisition the incoming information is selected by the user, it sets the radio OFF mode again.

4. The portable radio terminal of claim 1, further comprising an incoming information setting unit for previously setting acquisition or non-acquisition of incoming information as a process performed when a response for the inquiry about whether there is incoming information indicates that there is incoming information, and wherein when receiving a response indicating that there is incoming information, the incoming information process unit acquires the incoming information and sets the radio OFF mode again when acquisition of incoming information is previously set by the incoming information setting unit, and it sets the radio OFF mode again when non-acquisition of incoming information is previously set.

5. The portable radio terminal of claim 1, wherein when the radio OFF mode is canceled, the incoming information process unit inquires whether there is incoming information or not through the first communication unit, and sets the radio OFF mode again after a response has been received or when a predetermined time has elapsed since the radio OFF mode was canceled.

6. The portable radio terminal of claim 1, wherein when the radio OFF mode is set again by the incoming information process unit, the access monitoring unit monitors access for data processing from the external device, and cancels the radio OFF mode again when there is no access for a predetermined time.

7. A communication control method for a portable radio terminal including a communication unit for performing radio communication and another communication unit for performing communication with an external device, wherein the portable radio terminal sets a radio OFF mode that disables radio communication and performs data processing according to access from an external device when detecting the external device connected, and performs radio communication by cancelling the radio OFF mode when detecting no external device connected, comprising:
   a first step for monitoring access for data processing form an external device in the radio OFF mode, and cancelling the radio OFF mode when there is no access for a predetermined time;
   a second step for sending information to an external device in order not to perform data processing if there is access for data processing from the external device when the radio OFF mode is canceled, inquiring whether there is incoming information on the radio communication, and receiving a response; and
   a third step for setting the radio OFF mode again when the response is received.

8. The communication control method of claim 7, at the second step, sending information to an external device in order not to perform data processing when there is access for data processing from the external device in a state that the radio OFF mode is canceled, and acquiring incoming information through radio communication, and
   at the third step, setting the radio OFF mode again when incoming information is acquired in the second step.

9. The communication control method of claim 7, further comprising,
   at the third step,
   displaying a screen for selecting acquisition or non-acquisition of incoming information when the response received indicates that there is incoming information, and
   setting the radio OFF mode again after incoming information has been acquired when the acquisition of incoming information is selected by a user, and setting the radio OFF mode again when the non-acquisition of incoming information is selected by the user.

10. The communication control method of claim 7, further comprising,
   before the first step,
   previously setting acquisition or non-acquisition of incoming information as a process performed when a response for inquiry about whether there is incoming information is that there is incoming information, and at the third step, setting the radio OFF mode again after incoming information has been acquired when the acquisition of incoming information is previously set, and setting the radio OFF mode again when the non-acquisition of incoming information is previously set, when a response indicating that there is incoming information is received.

11. The communication control method of claim 7, further comprising a step of setting the radio OFF mode again when a predetermined time elapsed since the power OFF mode was canceled.

12. The communication control method of claim 7, repeating from the first step to the third step.

* * * * *